Dec. 29, 1953  C. N. WILLIAMSON  2,664,455
WEATHERPROOF VIBRATOR ASSEMBLY
Filed Nov. 29, 1951
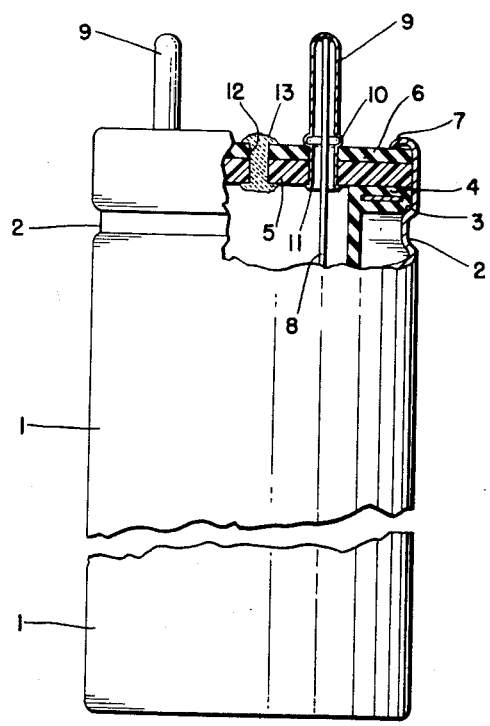
INVENTOR.
CLIFFORD N. WILLIAMSON
BY
ATTORNEYS Patented Dec. 29, 1953

2,664,455

UNITED STATES PATENT OFFICE 2,664,455

WEATHERPROOF VIBRATOR ASSEMBLY

Clifford N. Williamson, Cleveland, Ohio, assignor to Cornell-Dubilier Electric Corporation, South Plainfield, N. J., a corporation of Delaware Application November 29, 1951, Serial No. 258,907

1 Claim. (Cl. 174—52)

This invention relates generally to vibrators.

Vibrators, such for example, as those disclosed in Nace Patent No. 2,199,508, are usually enclosed in a metallic housing or can, which is closed at one end by means of a disc or plug of laminated plastic or like material, which is crimped in or otherwise secured to the open end of the housing, and through which the contact pins of the vibrator extend.

The seal between the disc and the pins and between the disc and the can is an imperfect seal, which allows "breathing" of the vibrator, due to atmospheric pressure and temperature changes. If the vibrators are stored under high humidity conditions, such as occur at least part of each year over much of the United States, the moisture in the air thus breathed in will result in an insulating film being formed on the surface of the tungsten contacts of the vibrator, and may even cause rusting of the spring steel parts of the vibrator.

In order to eliminate this difficulty, the assignee of the present application has been using a closure disc having a rubber facing or covering cemented to its outer face, so that when the can is crimped over the facing, the bases of the pins are also seated against the rubber, thereby forming a true hermetic seal for the vibrator. Although this has eliminated the difficulty due to "breathing," it was discovered that it was advantageous to allow an interchange of air during normal operation.

The present invention has as its primary object the provision of a vibrator of the aforesaid type in which the adverse effects of sealing are obviated and improved performance of the vibrator obtained.

Another object of the invention is to provide a vibrator of the character described, having a novel wax seal, which is highly effective to preserve the vibrator intact during its storage life.

Other objects and advantages of my invention will be apparent during the course of the following description. In the accompanying drawing forming a part of this specification and in which like numerals are employed to designate like parts throughout the same.

The single figure of the drawing is a fragmentary view, partly in elevation and partly in section, of a vibrator in which the novel features of the invention are embodied.

Referring to the drawing, reference numeral 1 designates a metallic container or can of a vibrator, which is annularly recessed adjacent its upper end, as at 2, to provide an annular seat or shoulder 3, upon which a mounting 4 of rubber or similar material is seated.

A disc or plug 5 of laminated plastic or similar material is seated on the mounting 4, and is provided with a facing or covering 6 of rubber, the rubber-faced disc being crimped by the container 1, as by flanging the upper end of the container over into engagement with the marginal portion of the facing 6, as at 7.

The wire leads 8 from the vibrator extend into hollow contact pins 9, which extend through the facing 6 and disc 5, and are crimped to the facing and disc by means of flanges or collars 10 and 11 and formed integrally with the pins 9. The collars 10 bear with considerable pressure against the rubber 6 and thus provide an effective seal between the pins and rubber-faced disc. Similarly, the flange 7 bears with considerable pressure against the marginal portion of the facing 6 and thus provides an effective seal between the can and rubber-faced disc.

In order to overcome the adverse effects of such an hermetic seal, I provide a small hole 12 in the rubber-faced disc and seal this hole with sealing material 13, having a melting point somewhat lower than the normal operating temperature of the vibrator depending on its application.

While the vibrator is in storage, the aforesaid seal seals the vibrator against atmospheric effects, since the sealing material will not melt at temperatures encountered in normal storage spaces, so that the vibrator is preserved intact during its storage life.

However, when the vibrator is placed in service, the heat generated by the vibrator and the surrounding components will melt the sealing material, and the expansion of the air inside the vibrator, caused by this heat, will force the sealing material out, venting the vibrator and giving the advantage of improved performance. Once the vibrator is placed in service, there will be no difficulty caused by "breathing," since operating, under normal conditions, will occur sufficiently often that the film on the contacts will be destroyed before it has become built up enough to cause trouble, and the heat of operation will dry the vibrator out. For those few cases where the vibrator load is insufficient to create enough heat to melt the sealing material, this same light load will result in the vibrator giving satisfactory performance.

The use of a fusible plug, as described, differs from the usual use of such plugs or similar sealing means in that the function of the plug is to melt incidental to the normal or usual operation of the device, in contrast to the usual function of melting only when the device is malfunctioning.

It is to be understood that the form of my invention, herewith shown and described, is to be taken as a preferred example of the same, and that various changes in the shape, size and arrangement of parts may be resorted to, without departing from the spirit of my invention, or the scope of the subjoined claim.

Having thus described my invention, I claim:

A vibrator assembly comprising a container, a vibrator element in said container, a disc of insulating material closing said container, a facing of rubber or other suitable material cemented to said disc, the upper end of said container being flanged over into engagement with said facing whereby a hermetic seal is provided between said flange and facing, said disc and facing having breathing openings therein, a plug of fusible material filling said openings, said plug having a melting point lower than the normal operating temperature of the vibrator and above normal ambient storage temperatures whereby said plug remains in situ under temperatures of normal storage conditions of the vibrator, but is expelled from said opening under temperatures of normal operating conditions of the vibrator.

CLIFFORD N. WILLIAMSON.

References Cited in the file of this patent

UNITED STATES PATENTS

| Number | Name | Date |
| --- | --- | --- |
| 2,144,959 | Blackburn | Jan. 24, 1939 |
| 2,282,459 | Deeley | May 12, 1942 |
| 2,313,379 | Wood | Mar. 9, 1943 |
| 2,389,592 | Bucklen et al. | Nov. 27, 1945 |
| 2,513,940 | Huetten et al. | July 4, 1950 |